UNITED STATES PATENT OFFICE.

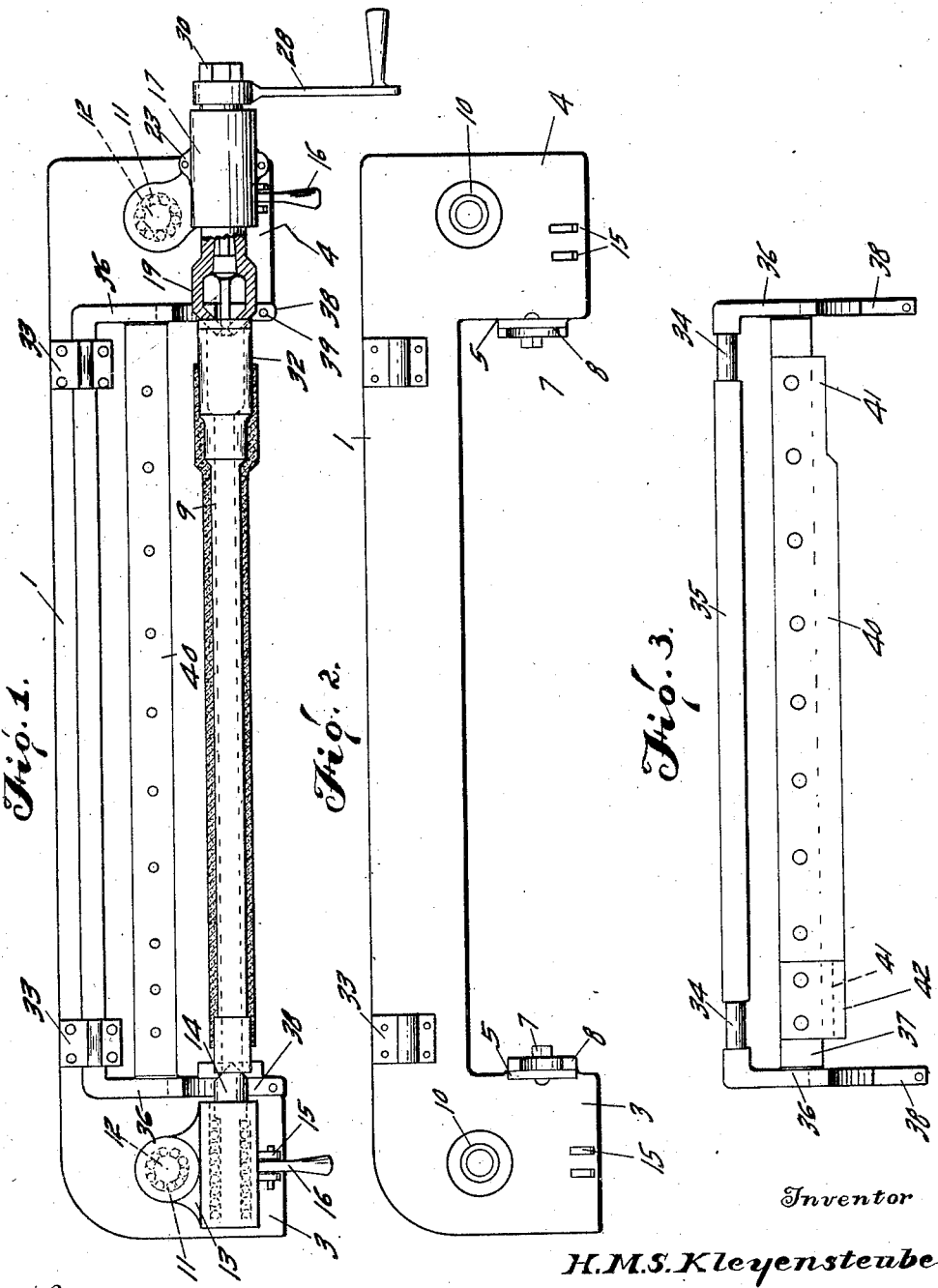

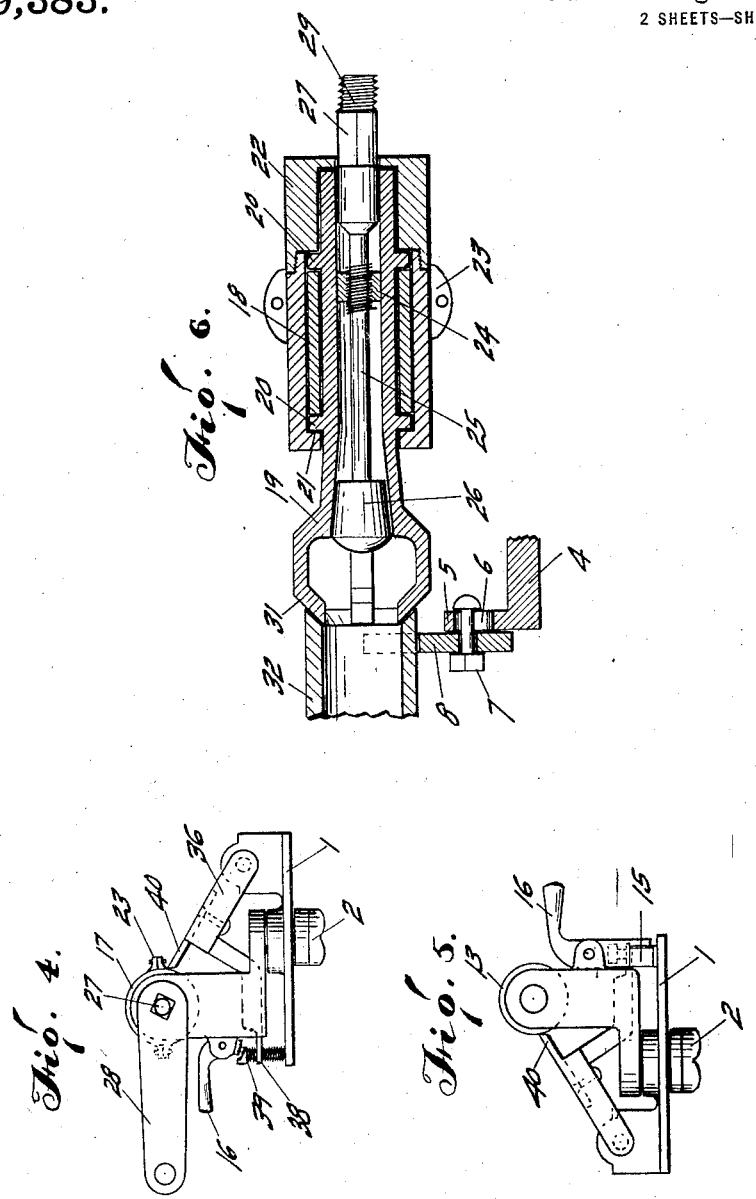

HARRY M. S. KLEYENSTEUBER, OF BIRMINGHAM, ALABAMA.

PIPE-CORE MACHINE.

1,349,383.   Specification of Letters Patent.   Patented Aug. 10, 1920.

Application filed September 29, 1919. Serial No. 327,311.

*To all whom it may concern:*

Be it known that I, HARRY M. S. KLEYENSTEUBER, a citizen of the United States of America, residing at Birmingham, in the county of Jefferson and State of Alabama, have invented certain new and useful Improvements in Pipe-Core Machines, of which the following is a specification.

My invention relates to improvements in core machines especially designed for the manufacture of soil pipe cores from green sand, which machines customarily comprise bearings on which the core turns and a radially slidable knife for trimming the sand from the rotating core.

There are certain defects in this apparatus, which are the cause of constant expense and trouble in the foundry, such for instance as the wear of the core arbor tending to produce over-weight pipes and variable thickness in the pipe walls; and the tendency of the knife from foreign matter caught thereby to form rings on the core, which defect is not often corrected, because of the trouble and time required in displacing, replacing and again adjusting the core knife.

The objects of my invention briefly stated are to provide centering elements, preferably mounted on ball bearings and rotatable, which are adapted to grab and support the arbor free of other supports during the core forming operation, thereby, preventing any wear on the arbor and avoiding the necessity of machining the arbor, as the centering elements will center the arbor with sufficient accuracy without requiring it to be machined; the mounting of the centering elements on horizontal swinging carriages, which will facilitate the insertion of the arbor and the removal of the finished core; the mounting of the knife on a hinged support, which can be freely swung to and from the work to facilitate the cleaning of the knife and thereby, to prevent the formation of rings on the core; the arrangement of the hinged knife support so as not only to present the knife in best position to the work, but to make possible a much more accurate adjustment of the knife than is possible where the knife carrier moves radially and in addition thereto, it enables me to provide adjustable stops onto which the knife support will drop thereby enabling it to resume its working position without requiring readjustment.

It is a distinctive feature of my invention that the arbor centering elements will lift the arbor clear of any other support, seats being provided to present the arbor in position to be grabbed and lifted therefrom, by the centering elements.

My invention also comprises the novel details of construction and arrangement of parts, which in their preferred construction only are illustrated in the accompanying drawings, in which:—

Figure 1 is a plan view on my core machine with the core sand shown in sections.

Fig. 2 is a plan view of the machine bed.

Fig. 3 is a plan view detached of the core knife support.

Figs. 4 and 5 are opposite end views of Fig. 1.

Fig. 6 is an enlarged sectional view taken through a core centering and turning mechanism.

Similar reference numerals refer to similar parts through the drawings.

In the preferred embodiment of my invention illustrated on the drawings, I have shown a soil pipe core machine embodying a bed 1 mounted on suitable supports or legs 2. The bed is provided at its ends with forward extensions 3 and 4, which along their edges have vertical lugs 5 cast thereon, and provided with elongated slots 6 (see Fig. 6) which receive the bolts 7 that serve to adjustably attach to said lugs the core arbor supports 8. These supports at their upper ends are provided with curved seats to receive the ends of the core arbor 9 and support it in position to be engaged by the centering elements which will now be described.

On the bed extension 3 is cast a bearing boss 10, which is bored vertically to receive a roller bearing 11 in which turns a vertical pin 12 integral with the swinging bearing 13, which is bored horizontally to form a chamber which receives an anti-friction bearing in which the centering pin 14 is free to turn. A pair of stop lugs 15, also cast on the extension frame 3, receive between them a latch 16, pivoted to the front of the bearing 13, so as to hold it with its centering pin in operating position. By lifting the latch the bearing 13 can be swung outwardly away from the work.

The frame extension 4 is provided with a boss 10 and ball bearing 11 in which turns the pin 12 of a swinging bearing 17. This bearing is provided with ball bearings 18, which rotatably support a centering clamp 19. This clamp has a tubular body cast with ring flanges 20, which are housed in the swinging bearing 17 and held in position between the flange 21 in the bearing at one end and a removable cap 22, screwed on the other end of the bearing. The bearing housing is preferably made in half sections, parted on a horizontal plane, each section comprising perforated lugs 23 for the reception of connecting screws or bolts. Within the hollow shank of the centering clamp, I mount fixedly a nut 24 and in threaded engagement with this nut is the shaft 25 carrying a spreader wedge 26 which works between the members forming the split head 19 of the clamp. The shaft 25 projects through the cap 22 and is squared at 27 to receive a crank 28 and is threaded at its outer end 29 to receive a retaining nut 30 for the crank.

The split head of the clamp is provided at its end adjacent to the arbor with taper faces 31, which in the preferred arrangement shown, are adapted to enter the tapered bore of the arbor at the bell end 32. The bearing 17 is provided with a latch 16, which is broken away in Fig. 4 and the bed extension 4 is provided with lugs 15 with which the latch coöperates to hold the bearings 17 in its operating position.

The bed near its rear edge, is provided with a pair of bearings 33 in which the reduced portions 34 of the pivoted knife support 35 are journaled. The knife support comprises parallel side arms 36 disposed at right angles to its main body and adapted to have attached thereto the ends of the knife supporting plate 37. Beyond the point of attachment of this plate the two arms are inclined sharply downwardly and then they extend outwardly to form horizontal ends 38, which are threaded to receive set screws 39 which engage the frame to support the knife plate at the proper adjustment. As shown in Figs. 4 and 5 the frame arms 36 normally set at an angle of approximately 45° to a horizontal plane, but this angle is a variable responsive to the set screws 39 and as it varies, it determines the relative position of the knife 40 to the core arbor. The knife 40, as illustrated, is reduced at both ends at 41 to make single or double hub pipe cores, and where, as in the illustration, only a single hub pipe core is to be made, a knife blade attachment 42 is mounted to form a continuance of the blade proper giving it a straight edge at one end.

In operation, the core arbor 19 is first set on its supports 8 and the bearings 13 and 17 are then swung into its engagement with the ends of the arbor and latched in this position. In thus engaging the arbor, the taper elements 14 and 31 will lift the arbor from its supports 8, whereupon, the crank 28 is turned with a result that the shaft 25 is screwed through the nut 24 causing the spreader 26 to spread the clamp jaws 31 until the arbor is firmly grasped between the centering elements 14 and 31 and as soon as this takes place, the continued turning of the crank will rotate the clamp 19 and turn the arbor supporting it free of contact with any fixed parts. The knife is then adjusted to the work by turning the set screws, the sand is shaken on from a hopper in the customary manner and the formation of the core proceeds in due course. If foreign matter in the sand tends to form rings on the sand core, it is only necessary to grasp the knife support, raise it sufficiently to permit the knife to be cleaned and then drop it back to its work and it will be apparent that in doing so, the set screws preserve the adjustment of the knife, thus enabling the knife to be cleaned with the greatest ease.

The arbor having no contact with any bearing while it is being turned, will have no wear and as the wear on the centering elements due to their anti-friction bearings, will be negligable, the centering of the core arbor will remain constant with the result that the pipe produced will have uniform thickness and correct weight. By eliminating any machine work on the arbors, they can be produced at much less cost than the present type of arbor. The taper surfaces at the ends of the arbor, whether such be on its inner or outer circumference, that are engaged by the centering elements are preferably chilled, thereby hardening them and giving them a more uniform contour.

The details of construction can be variously modified without departing from the spirit and scope of my invention.

What I claim is:—

1. In a machine for forming pipe-cores, seats for the core arbor, rotatable centering elements, movable to engage the ends of the arbor and lifting it from said seats, means to rotate the arbor and knife means to form the sand core.

2. In a machine for forming pipe-cores, seats for the core arbor, swinging frames movable toward said seats and carrying centering elements adapted to engage and lift the arbor from said seats, anti-friction bearings for said centering elements, means to rotate the arbor while supported by said elements, and a knife to form the sand core on the arbor.

3. In a machine for forming pipe-cores, means for rotating core arbor and a hinged knife support, adjustable stop means for the free end of said support and a knife blade carried by the support and disposed substantially tangential to the sand core being formed on the arbor.

4. In a machine for forming pipe-cores, a bed having forward extensions at its ends, anti-friction supporting elements for a core arbor adjustably mounted on said extensions, a knife support hinged to the frame and having arms projecting over said extensions, adjustable stops which support the free ends of said arms and a knife blade carried by the support and disposed substantially tangential to the sand core being formed on the arbor.

5. In a machine for forming pipe-cores, a frame, a pair of horizontally swinging bearings mounted on the frame, anti-friction bearing elements in said bearings, arbor centering devices rotatable in said anti-friction bearings, means to clamp the arbor in suspended position between said centering devices, means to rotate the arbor, and a knife to trim the sand core on the arbor.

6. In a machine for forming pipe-cores, a pair of centering elements relatively adjustable to engage and support between them an arbor, means on one of said elements to clamp the arbor positively thereto, bearings for said latter element, means for turning said latter element to rotate the arbor, and a knife to trim the sand core on the arbor.

7. In a machine for forming pipe-cores, a centering element for one end of the core arbor, a centering element having clamp means to positively engage the other end of the core arbor, means to rotate said latter element, and a knife means to trim the sand core.

8. In a machine for forming pipe-cores, means to engage and support one end of the core arbor, a clamp adapted to engage and center the other end of the arbor, wedge means for causing the clamp to positively engage the arbor and a crank for turning said clamp and arbor substantially as described.

9. In a machine for forming pipe-cores, a centering support for one end of the arbor, a clamp adapted to engage in the other end of the arbor and center it, said clamp having a split head, a wedge to spread said head, a shaft on which the wedge is mounted, a crank for turning said wedge shaft, and screw means for moving the shaft axially as it is rotated in the clamp to first apply the clamp to and then rotate it with the arbor.

10. In a machine for forming pipe-cores, means for supporting and rotating the core arbor, a hinged knife support having arms extending under the arbor, adjustable supports for the free ends of said arms, and a knife carried by said support and disposed substantially tangentially to the core to be formed on the arbor, said knife support arms having a clearance over-head to permit the knife blade to be disengaged from the sand core and cleaned without disturbing the adjustment of its supports, as substantially described.

In testimony whereof I, HARRY M. S. KLEYENSTEUBER, affix my signature.

HARRY M. S. KLEYENSTEUBER.

Witness:
H. H. K. JEFFERSON.